(12) United States Patent
Wu et al.

(10) Patent No.: US 11,476,915 B2
(45) Date of Patent: Oct. 18, 2022

(54) METHOD AND TERMINAL FOR PROCESSING CONFLICT IN COMMUNICATION SERVICE PROCEDURES

(71) Applicant: VIVO MOBILE COMMUNICATION CO., LTD., Chang'an Dongguan (CN)

(72) Inventors: Yumin Wu, Chang'an Dongguan (CN); Ran Yue, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 186 days.

(21) Appl. No.: 16/959,638

(22) PCT Filed: Jan. 2, 2019

(86) PCT No.: PCT/CN2019/070084
§ 371 (c)(1),
(2) Date: Jul. 1, 2020

(87) PCT Pub. No.: WO2019/137276
PCT Pub. Date: Jul. 18, 2019

(65) Prior Publication Data
US 2020/0389222 A1 Dec. 10, 2020

(30) Foreign Application Priority Data
Jan. 11, 2018 (CN) .......................... 201810027184.9

(51) Int. Cl.
*H04W 4/00* (2018.01)
*H04B 7/06* (2006.01)
(Continued)

(52) U.S. Cl.
CPC ......... *H04B 7/0695* (2013.01); *H04L 5/0094* (2013.01); *H04W 72/046* (2013.01);
(Continued)

(58) Field of Classification Search
CPC ............... H04B 7/0695; H04L 5/0094; H04W 72/0453; H04W 72/046; H04W 74/0833; H04W 76/16
(Continued)

(56) References Cited

U.S. PATENT DOCUMENTS

| 2014/0161070 | A1 | 6/2014 | Chang et al. |
| 2016/0100429 | A1* | 4/2016 | Boström ............... H04W 24/10 370/329 |

(Continued)

FOREIGN PATENT DOCUMENTS

| CN | 102271415 A | 12/2011 |
| CN | 105764126 A | 7/2016 |

(Continued)

OTHER PUBLICATIONS

International Search Report & Written Opinion related to Application No. PCT/CN2018/070084; dated Jul. 23, 2020.

*Primary Examiner* — Thai D Hoang
(74) *Attorney, Agent, or Firm* — von Briesen & Roper, s.c.

(57) ABSTRACT

The present disclosure discloses a method and a terminal for processing a conflict of communication service procedures. The method includes: processing a first communication service and a second communication service according to a predetermined processing manner if a second communication service initiation request sent by a network device is received while the first communication service is ongoing; wherein, the first communication service includes: a beam failure recovery request or a random access; and the second communication service includes: a secondary cell (SCell) deactivation or a supplementary uplink carrier (SUL) switching.

9 Claims, 2 Drawing Sheets processing a first communication service and a second communication service according to a predetermined processing manner if a second communication service initiation request sent by a network device is received while the first communication service is ongoing /11

(51) Int. Cl.
  *H04W 76/16* (2018.01)
  *H04L 5/00* (2006.01)
  *H04W 72/04* (2009.01)
  *H04W 74/08* (2009.01)

(52) U.S. Cl.
  CPC ... *H04W 72/0453* (2013.01); *H04W 74/0833* (2013.01); *H04W 76/16* (2018.02)

(58) Field of Classification Search
  USPC .................................. 370/329–330, 335–345
  See application file for complete search history.

(56) References Cited

U.S. PATENT DOCUMENTS

| | | | | |
|---|---|---|---|---|
| 2019/0149305 A1* | 5/2019 | Zhou | ..................... | H04L 1/0026 370/330 |
| 2019/0253986 A1* | 8/2019 | Jeon | ..................... | H04B 7/0695 |
| 2020/0383167 A1* | 12/2020 | Sengupta | ........... | H04W 72/0413 |
| 2020/0389222 A1* | 12/2020 | Wu | ....................... | H04B 7/0695 |
| 2021/0022052 A1* | 1/2021 | Lee | ................... | H04W 36/0072 |
| 2021/0051754 A1* | 2/2021 | Zhou | ...................... | H04B 7/088 |
| 2022/0046441 A1* | 2/2022 | Agiwal | ................ | H04L 5/0023 |
| 2022/0085862 A1* | 3/2022 | Kung | .................... | H04L 1/1819 |
| 2022/0140881 A1* | 5/2022 | Zhang | .................. | H04W 76/19 370/329 |
| 2022/0140884 A1* | 5/2022 | Shi | ........................ | H04W 76/18 370/329 |
| 2022/0149918 A1* | 5/2022 | Miao | ................... | H04B 7/0695 |

FOREIGN PATENT DOCUMENTS

| | | | | |
|---|---|---|---|---|
| WO | 2013004084 A | 1/2013 | | |
| WO | WO-2019032882 A1 * | 2/2019 | .......... | H04B 7/0695 |
| WO | WO-2021230544 A1 * | 11/2021 | | |

* cited by examiner processing a first communication service and a second communication service according to a predetermined processing manner if a second communication service initiation request sent by a network device is received while the first communication service is ongoing  /11

METHOD AND TERMINAL FOR PROCESSING CONFLICT IN COMMUNICATION SERVICE PROCEDURES

CROSS-REFERENCE TO RELATED APPLICATION

This application is the U.S. national phase of PCT Application No. PCT/CN2019/070084 filed on Jan. 2, 2019, which claims priority to Chinese Patent Application No, 201810027184.9 filed on Jan. 11, 2018, the disclosures of which are incorporated in their entirety by reference herein.

TECHNICAL FIELD

The present disclosure relates to the field of communication technology, and in particular to a method and a terminal for processing a conflict of communication service procedures.

BACKGROUND

In the $4^{th}$ Generation (4G) mobile communication system, or Long Time Evolution (LTE) system, Carrier Aggregation (CA) technology is introduced. Among others, the carrier aggregation technology is provided for a terminal, or user equipment (UE) to connect and communicate with the network through multiple cells. Among them, one cell serves as the Primary Cell (PCell) of the terminal, and the other cells serve as the Secondary Cells (SCells) of the terminal. The PCell is always in an activated state, while the initial state of the SCells is a deactivated state, and a SCell needs to be activated and deactivated through the Activation/Deactivation command of the Medium Access Control (MAC) layer. The activated state means that the UE can send and receive related uplink and downlink signals on the cell, and the deactivated state means that the UE stops sending and receiving related uplink and downlink signals on the cell.

In the $5^{th}$ Generation (5G) mobile communication system, or New Radio (NR) system, in a cell configured by the UE, two uplink carriers can be configured for one downlink carrier. One of the uplink carriers is used as a supplementary uplink carrier (SUL), which may be configured to the PCell or the SCell. The network device may issue a control command, such as an uplink transmission carrier conversion command, to switch the data transmission of the UE between different uplink carriers in a cell (i.e., SUL switching), that is, the data transmission is switched from a current working carrier to a target carrier.

The network device may also configure the UE with a working beam on the PCell and SCell, which is identified by a Synchronous Signal Block (SSB) or a Channel State Information-Reference Signal (CSI-RS). When the current working beam of the UE does not work normally, that is, a beam failure occurs, the UE will initiate a beam failure recovery request procedure, which includes the following steps:

Step 1: Starting a beam failure recovery timer to trigger a random access procedure, wherein the random access procedure may be a contention-based or non-contention-based random access procedure. Among them, the random access procedure refers to a procedure that the terminal sends a random access preamble to try to access the network device, and can be used not only for the beam failure recovery request procedure of partial resources when the beam fails, but also for general random access of other purposes, such as initial access, switching, Radio Resource Control (RRC) re-establishment, etc.

Step 2: If the downlink control channel received by the UE contains the Cell Radio Network Temporary Identifier (C-RNTI) of the UE, the UE determining that the beam failure recovery request procedure is successful and stopping the timing of the beam failure recovery timer; if the C-RNTI of the UE is still not detected in the downlink control channel when the beam failure recovery timer expires, determining that the beam failure recovery procedure fails.

The UE needs to activate and deactivate a corresponding SCell when receiving the activation/deactivation command issued by the network device, and needs to switch between different uplink carriers when receiving the uplink sending carrier switching command. When at least one of the above procedures occurs in the UE, a random access procedure or a beam failure recovery request procedure needs to be performed at the same time. In this case, the UE cannot determine which procedure is preferentially processed or whether the above procedures must be completed.

SUMMARY

The embodiments of the present disclosure provides a method and a terminal for processing a conflict of communication service procedures so as to solve a problem in the related art that it is impossible to determine how to deal with a conflict of communication service procedures.

In a first aspect, an embodiment of the present disclosure provides a method for processing a conflict of communication service procedures which is applied to terminal side, including:

processing a first communication service and a second communication service according to a predetermined processing manner if a second communication service initiation request sent by a network device is received while the first communication service is ongoing;

wherein, the first communication service includes: a beam failure recovery request or a random access; and the second communication service includes: a secondary cell (SCell) deactivation or a supplementary uplink carrier (SUL) switching.

In a second aspect, an embodiment of the present disclosure further provides a terminal including:

a processing module configured to process a first communication service and a second communication service according to a predetermined processing manner if a second communication service initiation request sent by a network device is received while the first communication service is ongoing;

wherein, the first communication service includes: a beam failure recovery request or a random access; and the second communication service includes: a secondary cell (SCell) deactivation or a supplementary uplink carrier (SUL) switching.

In a third aspect, an embodiment of the present disclosure provides a terminal including a processor, a storage, and a computer program stored on the storage and capable of running on the processor, the computer program implementing, when executed by the processor, the steps of the above method for processing a conflict of communication service procedures.

In a fourth aspect, an embodiment of the present disclosure provides a computer readable storage medium having a computer program stored thereon, the computer program implementing, when executed by a processor, the steps of the above method for processing a conflict of communication service procedures.

In this way, in the method and terminal for processing a conflict of communication service procedures of the embodiments of the present disclosure, if the terminal receives the second communication service initiation request sent by the network device during the initiation of the first communication service, it will process the first communication service and the second communication service according to a predetermined processing manner so as to avoid the conflict between the first communication service procedure and the second communication service procedure. In particular, the embodiments of the present disclosure can avoid the conflict between one of the beam failure recovery request procedure and the random access procedure, and the SCell deactivation or SUL switching procedure, thereby ensuring normal data transmission between the terminal and the network device.

BRIEF DESCRIPTION OF DRAWINGS

In order to explain the technical solutions of the embodiments of the present disclosure more clearly, the drawings needed to be used in the description of the embodiments of the present disclosure will be briefly introduced below. Obviously, the drawings in the following description are only some embodiments of the present disclosure. For those of ordinary skill in the art, without paying creative labor, other drawings can be obtained based on these drawings.

DETAILED DESCRIPTION

Figures 1, 2:
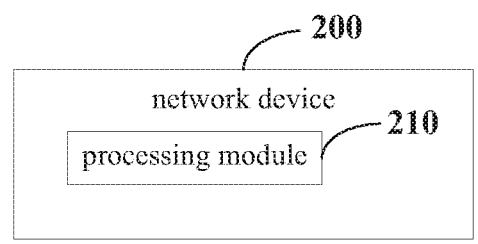
FIG. 1 is a schematic flowchart of a method for processing a conflict of communication service procedures according to an embodiment of the present disclosure.
FIG. 2 is a schematic diagram of module structure of a terminal according to an embodiment of the present disclosure.

The exemplary embodiments of the present disclosure will be described hereinafter in more details in conjunction with the drawings. Although the exemplary embodiments of the present disclosure are shown in the drawings, it should be understood that the present disclosure can be implemented in various forms and should not be limited by the embodiments set forth herein. Rather, these embodiments are provided to enable a more thorough understanding of the present disclosure and to fully convey the scope of the present disclosure to those skilled in the art.

The terms "first", "second", etc. in the specification and claims of this application are used to distinguish similar objects, and do not have to be used to describe a specific order or sequence. It should be understood that the data used in this way are interchangeable under appropriate circumstances, so that the embodiments of the present application described herein can be implemented in an order other than those illustrated or described herein, for example. In addition, the terms "comprising" and "having" and any variations thereof are intended to cover non-exclusive inclusions, for example, processes, methods, systems, products or devices that contain a series of steps or units need not be limited to those clearly listed steps or units, but may include other steps or units not explicitly listed or inherent to these processes, methods, products, or devices.

An embodiment of the present disclosure provides a method for processing a conflict of communication service procedures which is applied to terminal side. As shown in FIG. 1, the method may include the following steps:

Step 11: processing a first communication service and a second communication service according to a predetermined processing manner if a second communication service initiation request sent by a network device is received while the first communication service is ongoing.

Among others, the first communication service includes: a beam failure recovery request or a random access; and the second communication service includes: a secondary cell (SCell) deactivation or a supplementary uplink carrier (SUL) switching. Among the Physical Random Access Channel (PRACH) resources configured by the network device, part of the resources are used for general random access for purposes other than beam failure recovery, and the other resources are used for the terminal to send a beam failure recovery request when the beam fails, and the two parts of resources are orthogonal, that is, the PRACH resource used for sending the beam failure recovery request is orthogonal to the PRACH resource used for general random access (including time domain orthogonality, frequency domain orthogonality, and/or code domain orthogonality). Among them, the random access procedure mentioned here particularly refers to a general random access procedure used for purposes other than the beam failure recovery.

Hereinafter, the method for processing a conflict of communication service procedures in the embodiment of the present disclosure will be farther described in conjunction with different application scenarios.

Scenario I, the first communication service is the beam failure recovery request, and the second communication service is the SCell deactivation.

In this scenario, when beam failure occurs in a certain SCell of the terminal, the terminal initiates a procedure of beam failure recovery request for the beam failure. If the terminal receives an initiation request (command) for deactivating this SCell sent by the network device during the initiation of the beam failure recovery request, the terminal processes the beam failure recovery request and the SCell deactivation according to a predetermined processing manner. The predetermined processing manner includes, but is not limited to, one of the following:

Manner I:

The terminal cancels the beam failure recovery request procedure, and deactivates the SCell according to the SCell deactivation initiation request. In other words, when beam failure occurs in an SCell of the terminal, the terminal initiates a beam failure recovery request procedure for the beam failure; if the terminal receives the initiation request (command) for deactivating this SCell sent by the network device during the initiation of the beam failure recovery request, the terminal may cancel the beam failure recovery request procedure and deactivate the corresponding SCell according to the received SCell deactivation command.

Manner II:

The terminal performs the beam failure recovery request procedure, and ignores the SCell deactivation initiation request. In other words, when beam failure occurs in an SCell of the terminal, the terminal initiates a beam failure recovery request procedure for the beam failure; if the terminal receives the initiation request (command) for deactivating this SCell sent by the network device during the beam failure recovery request procedure, the terminal continues the beam failure recovery request procedure of the SCell and ignores the SCell deactivation command sent by the network device.

Manner III:

The terminal performs the beam failure recovery request procedure, and after the beam failure recovery request procedure is completed, deactivates the SCell according to the SCell deactivation initiation request. In other words, when beam failure occurs in an SCell of the terminal, the terminal initiates a beam failure recovery request procedure for the beam failure; if the terminal receives the initiation request (command) for deactivating this SCA sent by the network device during the initiation of the beam failure recovery request, the terminal continues the beam failure recovery request procedure of the SCell, and deactivates the SCell according to the received SCell deactivation command after the beam failure recovery request procedure is completed.

Scenario II, the first communication service is the beam failure recovery request, and the second communication service is the SUL switching In this scenario, one cell configured by the network device for the terminal has multiple uplink carriers (i.e., SULs configured by the network device for the terminal). When beam failure occurs in a certain carrier of the terminal, the terminal initiates a beam failure recovery request procedure for the beam failure. If the terminal receives the SUL switching initiation request (i.e., SUL switching command) sent by the network device during the initiation of the beam failure recovery request, the terminal processes the beam failure recovery request and the SUL switching according to a predetermined processing manner. The predetermined processing manner includes, but is not limited to, one of the following:

Manner I:

The terminal cancels the beam failure recovery request procedure, and switches uplink carrier according to the SUL switching initiation request. In other words, when beam failure occurs in a carrier of the terminal, the terminal initiates a beam failure recovery request procedure for the beam failure; if the terminal receives the SUL switching initiation request (i.e., SUL switching command) sent by the network device during the initiation of the beam failure recovery request, the terminal cancels the beam failure recovery request procedure directly and switches the uplink carrier according to the received SUL switching command. Wherein, the SUL switching initiation request carries indication information indicating a target uplink carrier therein, and switching the uplink carrier refers to switching the original uplink carrier to the target uplink carrier.

Manner II:

The terminal performs the beam failure recovery request procedure, and ignores the SUL switching initiation request. In other words, when beam failure occurs in a carrier of the terminal, the terminal initiates a beam failure recovery request procedure for the beam failure; if the terminal receives the SUL switching initiation request (i.e., SUL switching command) sent by the network device during the initiation of the beam failure recovery request, the terminal continues the beam failure recovery request procedure and ignores the SUL switching command sent by the network device.

Manner III:

The terminal performs the beam failure recovery request procedure, and after the beam failure recovery request procedure is completed, switches the uplink carrier according to the SUL switching initiation request. In other words, when beam failure occurs in a carrier of the terminal, the terminal initiates a beam failure recovery request procedure for the beam failure; if the terminal receives the SUL switching initiation request (i.e., SUL switching command) sent by the network device during the initiation of the beam failure recovery request, the terminal continues the beam failure recovery request procedure, and switches the uplink carrier according to the received SUL switching command after the beam failure recovery request procedure is completed.

Manner IV:

if the uplink carrier for initiating the beam failure recovery request procedure is the same as the target uplink carrier indicated by the SUL switching initiation request, the terminal performs the beam failure recovery request procedure, and switches the uplink carrier according to the SUL switching initiation request. Wherein, the SUL switching initiation request carries the indication information indicating the target uplink carrier therein. In other words, when beam failure occurs in a carrier of the terminal, the terminal initiates a beam failure recovery request procedure for the beam failure; when the terminal receives the SUL switching initiation request (i.e., SUL switching command) sent by the network device during the initiation of the beam failure recovery request, if the uplink carrier for initiating the beam failure recovery request procedure is the same as the target uplink carrier indicated by the SUL switching initiation request, the terminal continues the beam failure recovery request procedure, and switches the uplink carrier according to the received SUL switching command.

Manner V:

if the uplink carrier for initiating the beam failure recovery request procedure is different from the target uplink carrier indicated by the SUL switching initiation request, the terminal may perform one of the following according to a predetermined manner:

First Example

The terminal cancels the beam failure recovery request procedure. Wherein, the SUL switching initiation request carries the indication information indicating the target uplink carrier therein. In other words, when beam failure occurs in a carrier of the terminal, the terminal initiates a beam failure recovery request procedure for the beam failure; when the terminal receives the SUL switching initiation request (i.e., SUL switching command) sent by the network device during the initiation of the beam failure recovery request, if the uplink carrier for initiating the beam failure recovery request procedure is different from the target uplink carrier indicated by the SUL switching initiation request, the terminal cancels the beam failure recovery request procedure directly, and switches the uplink carrier according to the received SUL switching command.

Second Example

The terminal performs the beam failure recovery request procedure and ignores the SUL switching initiation request. Wherein, the SUL switching initiation request carries the indication information indicating the target uplink carrier therein. In other words, when beam failure occurs in a carrier of the terminal, the terminal initiates a beam failure recovery request procedure for the beam failure; when the terminal receives the SUL switching initiation request (i.e., SUL switching command) sent by the network device during the initiation of the beam failure recovery request, if the carrier in which the beam failure occurs is different from the target uplink carrier indicated by the SUL switching initiation request, the terminal continues the beam failure recovery request procedure directly, and ignores the SUL switching command sent by the network device.

Third Example

The terminal performs the beam failure recovery request procedure, and after the beam failure recovery request procedure is completed, switches the uplink carrier according to the SUL switching initiation request. Wherein, the SUL switching initiation request carries the indication information indicating the target uplink carrier therein, in other words, when beam failure occurs in a carrier of the terminal, the terminal initiates a beam failure recovery request procedure for the beam failure; when the terminal receives the SUL switching initiation request (i.e., SUL switching command) sent by the network device during the initiation of the beam failure recovery request, if the carrier in which the beam failure occurs is different from the target uplink carrier indicated by the SUL switching initiation request, the terminal continues the beam failure recovery request procedure directly, and switches the uplink carrier according to the received SUL switching command after the beam failure recovery request procedure is completed.

It should be noted that, the above beam failure recovery request procedure may be implemented through a random access procedure. In the Scenario II, during the process that the terminal initiates a beam failure recovery request for the beam failure, the uplink carrier that initiates the beam failure recovery request procedure may be a carrier that sends a random access signal.

Scenario III, the first communication service is the random access, and the second communication service is the SUL switching In this scenario, one cell configured by the network device for the terminal has multiple uplink carriers (i.e., SULs configured by the network device for the terminal). When the terminal receives the SUL switching initiation request (i.e., SUL switching command) sent by the network device, the terminal processes the random access and the SUL switching according to a predetermined processing manner. Wherein, the SUL switching initiation request carries the indication information indicating the target uplink carrier therein. The predetermined processing manner includes, but is not limited to, one of the following:

Manner I:

if the uplink carrier for initiating the random access procedure is the same as the target uplink carrier indicated by the SUL switching initiation request, performing the random access procedure, and switching the uplink carrier according to the SUL switching initiation request. In other words, when the terminal receives the SUL switching initiation request (i.e., SUL switching command) sent by the network device during the initiation of a random access procedure, if the uplink carrier for initiating the random access procedure is the same as the target uplink carrier indicated by the SUL switching initiation request, the terminal continues the random access procedure, and switches the uplink carrier according to the received SUL switching command.

Manner II:

If the uplink carrier for initiating the random access procedure is different from the target uplink carrier indicated by the SUL switching initiation request, the terminal may perform one of the following according to a predetermined manner:

First Example

The terminal cancels the random access procedure. Wherein, the SUL switching initiation request carries the indication information indicating the target uplink carrier therein. In other words, when the terminal receives the SUL switching initiation request (i.e., SUL switching command) sent by the network device during the initiation of the random access procedure, if the uplink carrier for initiating the random access procedure is different from the target uplink carrier indicated by the SUL switching initiation request, the terminal cancels the random access procedure directly, and switches the uplink carrier according to the received SUL switching command.

Second Example

The terminal performs the random access procedure and ignores the SUL switching initiation request. Wherein, the SUL switching initiation request carries the indication information indicating the target uplink carrier therein. In other words, when the terminal receives the SUL switching initiation request (i.e., SUL switching command) sent by the network device during the initiation of the random access procedure, if the uplink carrier for initiating the random access procedure is different from the target uplink carrier indicated by the SUL switching initiation request, the terminal continues the random access procedure, and ignores the SUL switching command sent by the network device.

Third Example

The terminal performs the random access procedure, and switches the uplink carrier according to the SUL switching initiation request after the random access procedure is completed. Wherein, the SUL switching initiation request carries the indication information indicating the target uplink carrier therein. In other words, when the terminal receives the SUL switching initiation request (i.e., SUL switching command) sent by the network device during the initiation of the random access procedure, if the uplink carrier for initiating the random access procedure is different from the target uplink carrier indicated by the SUL switching initiation request, the terminal continues the random access procedure, and switches the uplink carrier according to the received SUL switching command after the random access procedure is completed.

In the method for processing a conflict of communication service procedures according to the embodiment of the present disclosure, if the terminal receives the second communication service initiation request sent by the network device during the initiation of the first communication service, the terminal processes the first communication service and the second communication service according to a predetermined processing manner to avoid the conflict between the first communication service procedure and the second communication service procedure. In particular, the embodiment of the present disclosure can avoid the conflict between one of the beam failure recovery request procedure and the random access procedure, and the SCell deactivation or SUL switching procedure, thereby ensuring normal data transmission between the terminal and the network device.

The above embodiment introduces the methods for processing a conflict of communication service procedures in different scenarios, respectively. The embodiment will further describe below the corresponding terminal with reference to the drawings.

As shown in FIG. 2, a terminal 200 in the embodiment of the present disclosure can realize the details of the method in the above embodiment which processes the first communication service and the second communication service according to a predetermined processing manner when the second communication service initiation request sent by the network device is received during the initiation of the first communication service, and can achieve the same effects; wherein the first communication service includes: a beam failure recovery request or a random access; and the second communication service includes: a secondary cell (SCell) deactivation or a supplementary uplink carrier (SQL) switching. The terminal 200 specifically includes the following functional modules:

a processing module configured to process the first communication service and the second communication service according to a predetermined processing manner if a second communication service initiation request sent by a network device is received during the initiation of the first communication service;

wherein, the first communication service includes: the beam failure recovery request or the random access; and the second communication service includes: the secondary cell (SCell) deactivation or the supplementary uplink carrier (SUL) switching.

When the first communication service is the beam failure recovery request, and the second communication service is the SCell deactivation, the processing module includes one of the following:

a first processing sub-module configured to cancel the beam failure recovery request procedure, and deactivate the SCell according to an SCell deactivation initiation request;

a second processing sub-module configured to perform the beam failure recovery request procedure, and ignore the SCA deactivation initiation request; and a third processing sub-module configured to perform the beam failure recovery request procedure, and after the beam failure recovery request procedure is completed, deactivate the SCell according to the SCell deactivation initiation request.

When the first communication service is the beam failure recovery request, and the second communication service is the SUL switching, the processing module further includes one of the following:

a fourth processing sub-module configured to cancel the beam failure recovery request procedure, and switch uplink carrier according to an SUL switching initiation request;

a fifth processing sub-module configured to perform the beam failure recovery request procedure, and ignore the SUL switching initiation request;

a sixth processing sub-module configured to perform the beam failure recovery request procedure, and after the beam failure recovery request procedure is completed, switch the uplink carrier according to the SUL switching initiation request;

if an uplink carrier for initiating the beam failure recovery request procedure is the same as a target uplink carrier indicated by the SUL switching initiation request, perform the beam failure recovery request procedure, and switch the uplink carrier according to the SUL switching initiation request;

a seventh processing sub-module configured to, if the uplink carrier for initiating the beam failure recovery request procedure is different from the target uplink carrier indicated by the SUL switching initiation request, cancel the beam failure recovery request procedure, or perform the beam failure recovery request procedure and ignore the SUL switching initiation request, or perform the beam failure recovery request procedure, and after the beam failure recovery request procedure is completed, switch the uplink carrier according to the SUL switching initiation request.

When the first communication service is the random access, and the second communication service is the SUL switching, the processing module further includes one of the following:

an eighth processing sub-module configured to, if an uplink carrier for initiating the random access procedure is the same as a target uplink carrier indicated by the SUL switching initiation request, perform the random access procedure, and switch the uplink carrier according to the SUL switching initiation request;

a ninth processing sub-module configured to, if the uplink carrier for initiating the random access procedure is different from the target uplink carrier indicated by the SUL switching initiation request, cancel the random access procedure, or perform the random access procedure and ignore the SUL, switching initiation request, or perform the random access procedure, and after the random access procedure is completed, switch the uplink carrier according to the SUL switching initiation request.

It should be noted that, if the terminal in the embodiment of the present disclosure receives the second communication service initiation request sent by the network device during the initiation of the first communication service, the terminal processes the first communication service and the second communication service according to a predetermined processing manner to avoid the conflict between the first communication service procedure and the second communication service procedure. In particular, the embodiment of the present disclosure can avoid the conflict between one of the beam failure recovery request procedure and the random access procedure, and the SCell deactivation or SUL switching procedure, thereby ensuring normal data transmission between the terminal and the network device.

It should be noted that, the division of the above modules is only a division of logical functions, and in practical implementations, they may be integrated in whole or part into a physical entity, or may be physically separated. And these modules can all be implemented in the form of software which is called by the processing element; they can also be implemented in the form of hardware; some modules can also be implemented by the processing element calling software, and some modules can be implemented in hardware. For example, the determination module may be a separately established processing element, or may be implemented by being integrated in a chip of the above device, and may also be stored in the storage of the above device in the form of program codes, called by a processing element of the above device to execute the function of the above determination module. The implementations of other modules are similar. In addition, all or part of these modules can be integrated together or can be implemented independently. The processing element described here may be an integrated circuit with signal processing capability. In the implementation process, each step of the above method or each of the above modules may be implemented by an integrated logic circuit of hardware in the processor element or by instructions in the form of software.

For example, the above modules may be one or more integrated circuits configured to implement the above method, for example: one or more Application Specific Integrated Circuit (ASIC for short), or one or more microprocessors (DSP), or one or more Field. Programmable Gate Array (FPGA), etc. As another example, when one of the above modules is implemented by a processing element scheduling program codes, the processing element may be a general-purpose processor, such as a Central processing Unit (CPU) or another processor that can call program codes. As another example, these modules can be integrated together and implemented in the form of a system-on-a-chip (SOC).

Figure 3:
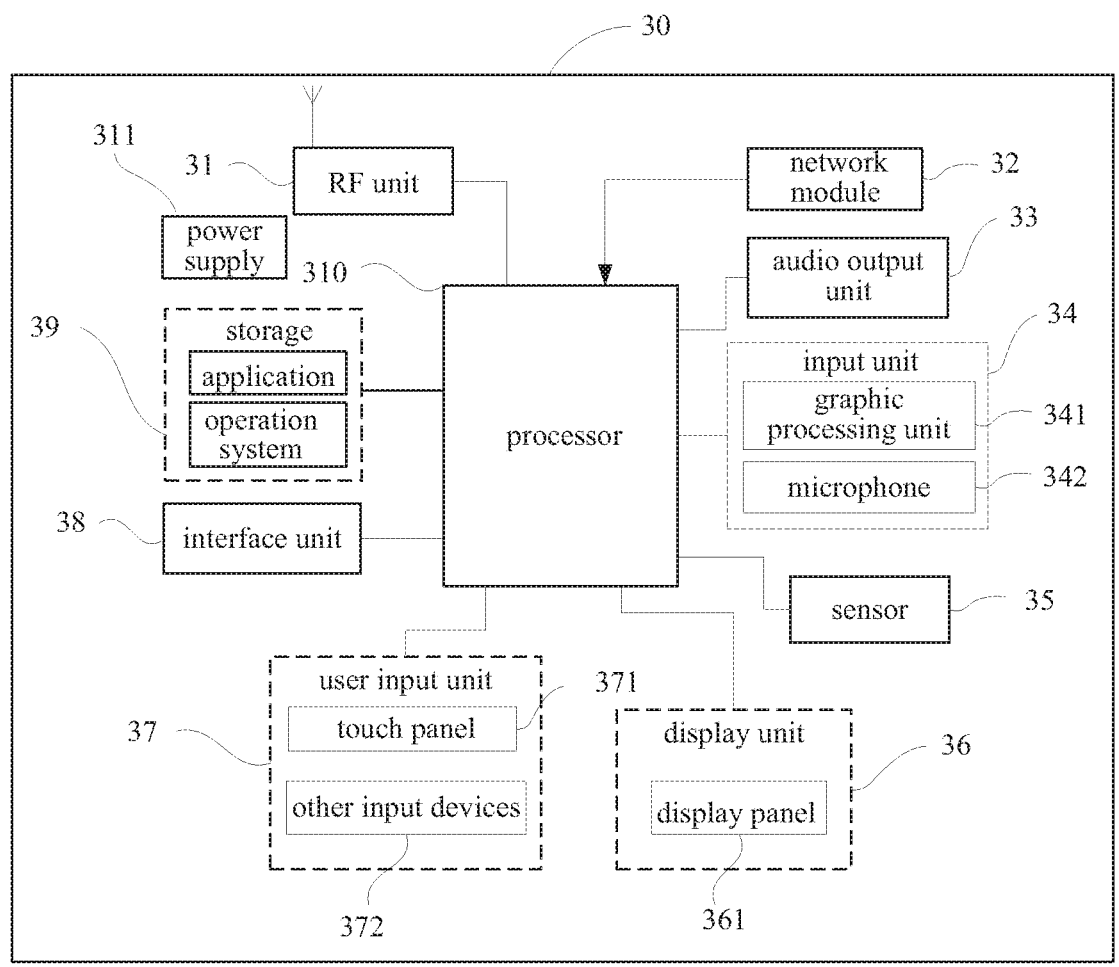
FIG. 3 is a block diagram of a terminal according to an embodiment of the present disclosure.

In order to better achieve the above object, further, FIG. 3 is a schematic diagram of a hardware structure of a terminal for implementing various embodiments of the present disclosure. The terminal 30 includes but is not limited to: a radio frequency unit 31, a network module 32, an audio output unit 33, an input unit 34, a sensor 35, a display unit 36, a user input unit 37, an interface unit 38, a storage 39, a processor 310, a power supply 311 and other components. Those skilled in the art may understand that the terminal structure shown in FIG. 3 does not constitute a limitation on the terminal, and the terminal may include more or fewer components than those illustrated, or combine some components, or have different component arrangement. In the embodiment of the present disclosure, the terminal includes but is not limited to a mobile phone, a tablet, a notebook, a palmtop computer, a vehicle-mounted terminal, a wearable device, a pedometer, and the like.

Among them, the radio frequency unit 31 is configured to receive and send data under the control of the processor 310;

the processor 310 is configured to process a first communication service and a second communication service according to a predetermined processing manner if receiving a second communication service initiation request sent by a network device while the first communication service is ongoing; wherein, the first communication service includes: a beam failure recovery request or a random access; and the second communication service includes: a secondary cell (SCell) deactivation or a supplementary uplink carrier (SUL) switching.

If the terminal in the embodiment of the present disclosure receives the second communication service initiation request sent by the network device during the initiation of the first communication service, the terminal processes the first communication service and the second communication service according to a predetermined processing manner to avoid the conflict between the first communication service procedure and the second communication service procedure. In particular, the embodiment of the present disclosure can avoid the conflict between one of the beam failure recovery request procedure and the random access procedure, and the SCell deactivation or SUL switching procedure, thereby ensuring normal data transmission between the terminal and the network device.

It should be understood that, in the embodiment of the present disclosure, the radio frequency unit 31 may be used to receive and send signals during sending and receiving information or during a call. Specifically, after receiving the downlink data from the base station, the processor 310 processes the data; also, the uplink data is sent to the base station. Generally, the radio frequency unit 31 includes, but is not limited to, an antenna, at least one amplifier, a transceiver, a coupler, a low noise amplifier, a duplexer, and the like. In addition, the radio frequency unit 31 can also communicate with the network and other devices through a wireless communication system.

The terminal provides users with wireless access to the broadband Internet through the network module 32, such as helping users to send and receive e-mail, browse web pages, access streaming media, and the like.

The audio output unit 33 may convert the audio data received by the radio frequency unit 31 or the network module 32 or stored in the storage 39 into an audio signal and output as sound. Moreover, the audio output unit 33 may also provide audio output related to specific functions performed by the terminal 30 (e.g., call signal reception sound, message reception sound, etc.). The audio output unit 33 includes a speaker, a buzzer, a receiver, and the like.

The input unit 34 is used to receive audio or video signals. The input unit 34 may include a Graphics processing Unit (GPU) 341 and a microphone 342. The graphics processing unit 341 processes image data of still pictures or video obtained by an image capturing device (such as a camera) in the video capturing mode or the image capturing mode. The processed image frame may be displayed on the display unit 36. The image frame processed by the graphics processing unit 341 may be stored in the storage 39 (or other storage medium) or sent via the radio frequency unit 31 or the network module 32. The microphone 342 can receive sound, and can process such sound into audio data. The processed audio data can be converted into a format that can be sent to the mobile communication base station via the radio frequency unit 31 in the telephone call mode, and can be output.

The terminal 30 also includes at least one sensor 35, such as a light sensor, a motion sensor, and other sensors. Specifically, the light sensor includes an ambient light sensor and a proximity sensor, wherein the ambient light sensor can adjust the brightness of the display panel 361 according to the brightness of the ambient light, and the proximity sensor can close the display panel 361 and/or the backlight when the terminal 30 moves to the ear. As a type of motion sensor, the accelerometer sensor can detect the magnitudes of accelerations in various directions (generally three axes), and can detect the magnitude and direction of gravity when not moving, and can be used to recognize the posture of the terminal (such as horizontal and vertical screen switching, related games, magnetometer attitude calibration), to perform vibration recognition related functions (such as pedometer, tapping), etc.; the sensor 35 may also include a fingerprint sensor, a pressure sensor, an iris sensor, a molecular sensor, a gyroscope, a barometer, a hygrometer, a thermometer, an infrared sensor, etc., which will not be repeated here.

The display unit 36 is used to display information input by the user or information provided to the user. The display unit 36 may include a display panel 361, and the display panel 361 may be configured in the form of a Liquid Crystal Display (LCD), an Organic Light-Emitting Diode (OLED), or the like.

The user input unit 37 may be used to receive input numeric or character information, and generate key signal input related to user settings and function control of the terminal. Specifically, the user input unit 37 includes a touch panel 371 and other input devices 372. The touch panel 371, also known as a touch screen, can collect user's touch operation on or near it (for example, the user's operation on or near the touch panel 371 using any suitable object or accessory, such as a finger or a stylus). The touch panel 371 may include a touch detection device and a touch controller. Among them, the touch detection device detects the user's touch orientation, and detects the signal generated by the touch operation, and transmits the signal to the touch controller; the touch controller receives touch information from the touch detection device and converts it into contact coordinates, then sends the same to the processor 310, and receives and executes the command sent by the processor 310. In addition, the touch panel 371 can be implemented in various types such as resistive, capacitive, infrared, and surface acoustic wave types. In addition to the touch panel 371, the user input unit 37 may also include other input devices 372. Specifically, other input devices 372 may include, but are not limited to, a physical keyboard, function keys (such as volume control buttons, switch buttons, etc.), a trackball, a mouse, and a joystick, which will not be repeated here.

Further, the touch panel 371 may be overlaid on the display panel 361. When the touch panel 371 detects a touch operation on or near it, it transmits the touch operation to the processor 310 to determine the type of touch event, and then the processor 310 provides a corresponding visual output on the display panel 361 according to the type of touch event. Although in FIG. 3, the touch panel 371 and the display panel 361 are implemented as two independent components to realize the input and output functions of the terminal, in some embodiments, the touch panel 371 and the display panel 361 may be integrated to implement the input and output functions of the terminal, which is not limited here.

The interface unit 38 is an interface for connecting an external device to the terminal 30, For example, the external device may include a wired or wireless headset port, an external power (or battery charger) port, a wired or wireless data port, a memory card port, a port for connecting a device having an identification module, an audio input/output (I/O) port, a video I/O port, a headphone port, etc. The interface unit 38 may be used to receive input from external devices (e.g., data information, power, etc.) and transmit the received input to one or more elements within the terminal 30 or may be used to transfer data between the terminal 30 and the external devices.

The storage 39 may be used to store software programs and various data. The storage 39 may mainly include a program storage area and a data storage area, wherein the program storage area may store an operating system, applications required by at least one function (such as a sound playback function, an image playback function, etc.); the data storage area may store data created according to the use of a mobile phone (such as audio data, phone books, etc.), etc. In addition, the storage 39 may include a high-speed random access memory, and may also include a non-volatile storage, such as at least one magnetic disk storage device, a flash memory device, or other volatile solid-state storage devices.

The processor 310 is the control center of the terminal, connects various parts of the entire terminal by using various interfaces and lines, performs various functions and processing data of the terminal by running or executing software programs and/or modules stored in the storage 39 and calling data stored in the storage 39, so as to monitor the terminal as a whole. The processor 310 may include one or more processing units; preferably, the processor 310 may integrate an application processor and a modern processor, where the application processor mainly processes an operating system, a user interface, and applications, etc. The modern processor mainly processes wireless communication. It can be understood that the foregoing modem processor may not be integrated into the processor 310.

The terminal 30 may further include a power supply 311 (such as a battery) that supplies power to various components. Preferably, the power supply 311 may be logically connected to the processor 310 through a power management system, so as to implement charging, discharging, and power consumption management through the power management system.

In addition, the terminal 30 includes some unillustrated functional modules, which will not be repeated here.

Preferably, an embodiment of the present disclosure further provides a terminal including a processor 310, a storage 39, a computer program stored on the storage 39 and capable of running on the processor 310. When executed by the processor 310, the computer program implements various processes of the embodiment of the method for processing a conflict of communication service procedures, and can achieve the same technical effects, which will not be described here to avoid repetition. The terminal may be either a wireless terminal or a wired terminal. The wireless terminal may be a device that provides voice and/or other service data connectivity to a user, a handheld device with a wireless connection function, or other processing device connected to a wireless modem. The wireless terminal can communicate with one or more core networks via a Radio Access Network (RAN for short). The wireless terminal can be a mobile terminal, such as a mobile phone (or "cellular" phone) acid a computer with a mobile terminal, for example, may be a portable, pocket-sized, hand-held, computer built-in or on-vehicle mobile device that exchanges language and/or data with the wireless access network, for example, a Personal Communication Service (PCS) phone, a cordless phone, a Session Initiation Protocol (SIP) phone, a Wireless Local Loop (WLL) station, a Personal Digital Assistant (PDA) and other devices. The wireless terminal may also be called a system, a subscriber unit, a subscriber station, a mobile station, a mobile, a remote station, a remote terminal, an access terminal, a user terminal, a user agent, a user equipment (or user device), which are not limited here.

An embodiment of the present disclosure further provides a computer readable storage medium having a computer program stored thereon. When executed by a processor, the computer program implements the processes of the above method embodiment for processing a conflict of communication service procedures, and can achieve the same technical effects, which will not be described here to avoid repetition. The computer readable storage medium may be a Read Only Memory (ROM), a Random Access Memory (RAM), a magnetic disk, an optical disk, etc.

Those of ordinary skill in the art may realize that the units and algorithm steps of the examples described in conjunction with the embodiments disclosed herein can be implemented by electronic hardware, or a combination of computer software and electronic hardware. Whether these functions are executed in hardware or software depends on the specific applications of the technical solutions and design constraints. Professional technicians can use different methods to implement the described functions for each specific application, but such implementation should not be considered beyond the scope of the present disclosure.

Those skilled in the art can clearly understand that, for the convenience and conciseness of the description, the specific working processes of the systems, devices and units described above can refer to the corresponding processes in the foregoing method embodiments, which will not be repeated here.

In the embodiments provided in the application, it should be understood that the disclosed devices and methods may be implemented in other ways. For example, the device embodiments described above are only schematic. For example, the division of the units is only a division of logical functions. In practical implementations, there may be other divisions; for example, multiple units or components may be combined or may be integrated into another system, or some features may be ignored, or not implemented. In addition, the illustrated or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or may be distributed on multiple network units. Some or all of the units may be selected according to actual needs to achieve the object of the solutions of the embodiment.

In addition, the functional units in each embodiment of the present disclosure may be integrated into one processing unit, or each unit may exist alone physically, or two or more units may be integrated into one unit.

If the functions are implemented in the form of software functional units and sold or used as independent products, they can be stored in a computer readable storage medium. Based on such an understanding, the essential technical solutions of the present disclosure, or part of the technical solutions that contributes to the related art, or part of the technical solution, can be embodied in the form of a software product; the computer software product is stored in a storage medium, including several instructions used to cause a computer device (which may be a personal computer, a server, or a network device, etc) to perform all or part of the steps of the methods described in various embodiments of the present disclosure. The foregoing storage medium include various media that can store program codes, such as a USB drive, a mobile hard disk, a ROM, a RAM, a magnetic disk, or an optical disk, or the like.

In addition, it should be noted that, in the devices and methods of the present disclosure, obviously, various components or steps may be decomposed and/or recombined. These decompositions and/or recombination should be regarded as equivalent solutions of the present disclosure. Moreover, the steps for performing the above series of processing can naturally be executed over time in the order described, but it does not necessarily need to be executed over time, and some steps can be executed in parallel or independently of each other. Those of ordinary skill in the art, who can understand all or any steps or components of the methods and devices of the present disclosure, can implement them by using hardware, firmware, software or the combination thereof in any computing device (including a processor, a storage medium, etc.) or a network of computing devices, which can be achieved by those of ordinary skill in the art using their basic programming skills after reading the description of the present disclosure.

Therefore, the object of the present disclosure can also be achieved by running a program or a group of programs on any computing device. The computing device may be a well-known general-purpose device. Therefore, the object of the present disclosure can also be achieved only by providing a program product containing program codes for implementing the methods or devices. That is, such a program product also constitutes the present disclosure, and a storage medium storing such a program product also constitutes the present disclosure. Obviously, the storage medium may be any known storage medium or any storage medium developed in the future. It should also be noted that, in the devices and methods of the present disclosure, obviously, various components or steps can be decomposed and/or recombined. These decompositions and/or recombination should be regarded as equivalent solutions of the present disclosure. Moreover, the steps for performing the above series of processing can naturally be performed over time in the order described, but it does not necessarily need to be performed over time. Certain steps can be performed in parallel or independently of each other.

The above are preferred embodiments of the present disclosure. It should be noted that, for those of ordinary skill in the art, several improvements and modifications can be made without departing from the principle described in the present disclosure, which also fall within the protective scope of the present disclosure.

What is claimed is:

1. A method for processing a conflict of communication service procedures which is applied to terminal side, comprising:
    processing a first communication service and a second communication service according to a predetermined processing manner if a second communication service initiation request sent by a network device is received while the first communication service is ongoing;
    wherein, the first communication service comprises: a beam failure recovery request or a random access; and the second communication service comprises: a secondary cell (SCell) deactivation or a supplementary uplink carrier (SUL) switching.

2. The method for processing a conflict of communication service procedures according to claim 1, wherein, when the first communication service is the beam failure recovery request, and the second communication service is the SCell deactivation, the step of processing the first communication service and the second communication service according to the predetermined processing manner comprises one of:
    cancelling a beam failure recovery request procedure, and deactivating the SCell according to an SCell deactivation initiation request;
    performing the beam failure recovery request procedure, and ignoring the SCell deactivation initiation request; and
    performing the beam failure recovery request procedure, and after the beam failure recovery request procedure is completed, deactivating the SCell according to the SCell deactivation initiation request.

3. The method for processing a conflict of communication service procedures according to claim 1, wherein, when the first communication service is the beam failure recovery request, and the second communication service is the SUL switching, the step of processing the first communication service and the second communication service according to the predetermined processing manner comprises one of:
    cancelling the beam failure recovery request procedure, and switching uplink carrier according to an SUL switching initiation request;
    performing the beam failure recovery request procedure, and ignoring the SUL switching initiation request; and
    performing the beam failure recovery request procedure, and after the beam failure recovery request procedure is completed, switching the uplink carrier according to the SUL switching initiation request;
    if an uplink carrier for initiating the beam failure recovery request procedure is the same as a target uplink carrier indicated by the SUL switching initiation request, performing the beam failure recovery request procedure, and switching the uplink carrier according to the SUL switching initiation request;

if the uplink carrier for initiating the beam failure recovery request procedure is different from the target uplink carrier indicated by the SUL switching initiation request, cancelling the beam failure recovery request procedure, or performing the beam failure recovery request procedure and ignoring the SUL switching initiation request, or performing the beam failure recovery request procedure, and after the beam failure recovery request procedure is completed, switching the uplink carrier according to the SUL switching initiation request.

4. The method for processing a conflict of communication service procedures according to claim 1, wherein, when the first communication service is the random access, and the second communication service is the SUL switching, the step of processing the first communication service and the second communication service according to the predetermined processing manner comprises one of:

if an uplink carrier for initiating a procedure of the random access is the same as a target uplink carrier indicated by the SUL switching initiation request, performing the random access procedure, and switching the uplink carrier according to the SUL switching initiation request;

if the uplink carrier for initiating the random access procedure is different from the target uplink carrier indicated by the SUL switching initiation request, cancelling the random access procedure, or performing the random access procedure and ignoring the SUL switching initiation request, or performing the random access procedure, and after the random access procedure is completed, switching the uplink carrier according to the SUL switching initiation request.

5. A terminal comprising a processor, a storage, and a computer program stored on the storage and capable of running on the processor, the computer program implementing, when executed by the processor, the steps of a method for processing a conflict of communication service procedures which is applied to terminal side, the method comprising:

processing a first communication service and a second communication service according to a predetermined processing manner if a second communication service initiation request sent by a network device is received while the first communication service is ongoing;

wherein, the first communication service comprises: a beam failure recovery request or a random access; and the second communication service comprises: a secondary cell (SCell) deactivation or a supplementary uplink carrier (SUL) switching.

6. A non-transitory computer readable storage medium having a computer program stored thereon, the computer program implementing, when executed by a processor, the following steps for processing a conflict of communication service procedures:

processing a first communication service and a second communication service according to a predetermined processing manner if a second communication service initiation request sent by a network device is received while the first communication service is ongoing;

wherein, the first communication service comprises: a beam failure recovery request or a random access; and the second communication service comprises: a secondary cell (SCell) deactivation or a supplementary uplink carrier (SUL) switching.

7. The terminal according, to claim 5, wherein in the method implemented by the computer program when executed by the processor, wherein, when the first communication service is the beam failure recovery request, and the second communication service is the SCell deactivation, the step of processing the first communication service and the second communication service according to the predetermined processing manner comprises one of:

cancelling a beam failure recovery request procedure, and deactivating the SCell according to an SCell deactivation initiation request;

performing the beam failure recovery request procedure, and ignoring the SCell deactivation initiation request; and performing the beam failure recovery request procedure, and after the beam failure recovery request procedure is completed, deactivating the SCell according to the SCell deactivation initiation request.

8. The terminal according to claim 5, wherein in the method implemented by the computer program when executed by the processor, wherein, when the first communication service is the beam failure recovery request, and the second communication service is the SUL switching, the step of processing the first communication service and the second communication service according to the predetermined processing manner comprises one of:

cancelling the beam failure recovery request procedure, and switching uplink carrier according to an SUL switching initiation request;

performing the beam failure recovery request procedure, and ignoring the SUL switching initiation request; and performing the beam failure recovery request procedure, and after the beam failure recovery request procedure is completed, switching the uplink carrier according to the SUL switching initiation request;

if an uplink carrier for initiating the beam failure recovery request procedure is the same as a target uplink carrier indicated by the SUL switching initiation request, performing the beam failure recovery request procedure, and switching the uplink carrier according to the SUL switching initiation request;

if the uplink carrier for initiating the beam failure recovery request procedure is different from the target uplink carrier indicated by the SUL switching initiation request, cancelling the beam failure recovery request procedure, or performing the beam failure recovery request procedure and ignoring the SUL switching initiation request, or performing the beam failure recovery request procedure, and after the beam failure recovery request procedure is completed, switching the uplink carrier according to the SUL switching initiation request.

9. The terminal according to claim 5, wherein in the method implemented by the computer program when executed by the processor, wherein, when the first communication service is the random access, and the second communication service is the SUL switching, the step of processing the first communication service and the second communication service according to the predetermined processing manner comprises one of:

if an uplink carrier for initiating a procedure of the random access is the same as a target uplink carrier indicated by the SUL switching initiation request, performing the random access procedure, and switching the uplink carrier according to the SUL switching initiation request;

if the uplink carrier for initiating the random access procedure is different from the target uplink carrier indicated by the SUL switching initiation request, cancelling the random access procedure, or performing the random access procedure and ignoring the SUL switching initiation request, or performing the random access procedure, and after the random access procedure is completed, switching the uplink carrier according to the SUL switching initiation request.

* * * * *